United States Patent
Bueter et al.

(10) Patent No.: US 10,749,747 B1
(45) Date of Patent: Aug. 18, 2020

(54) METHODS FOR MANAGING NETWORK DEVICE CONFIGURATIONS AND DEVICES THEREOF

(71) Applicant: JPMorgan Chase Bank, N.A., New York, NY (US)

(72) Inventors: Bryan A. Bueter, Grove City, OH (US); Matthew Irving Martin, Columbus, OH (US); Lindsey Barber, League City, TX (US); Stephen J. Rosmann, Katy, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 240 days.

(21) Appl. No.: 15/807,342

(22) Filed: Nov. 8, 2017

(51) Int. Cl.
*H04L 12/24* (2006.01)

(52) U.S. Cl.
CPC ........ *H04L 41/0866* (2013.01); *H04L 41/064* (2013.01); *H04L 41/0853* (2013.01); *H04L 41/0893* (2013.01); *H04L 41/22* (2013.01)

(58) Field of Classification Search
None
See application file for complete search history.

(56) References Cited

U.S. PATENT DOCUMENTS

| | | | | |
|---|---|---|---|---|
| 2002/0069274 | A1* | 6/2002 | Tindal | H04L 41/0893 709/223 |
| 2007/0106768 | A1* | 5/2007 | Frietsch | H04L 41/06 709/223 |
| 2008/0301765 | A1* | 12/2008 | Nicol | H04L 41/142 726/1 |
| 2012/0173691 | A1* | 7/2012 | Kothe | H04L 41/0266 709/223 |

OTHER PUBLICATIONS

E-Security Partner Sales Guide. Winter 2002. (Year: 2002).*

* cited by examiner

*Primary Examiner* — Scott B Christensen
(74) *Attorney, Agent, or Firm* — Greenblum & Bernstein, P.L.C.

(57) ABSTRACT

Methods, non-transitory computer readable media, and configuration management server device that obtain, via one or more communication networks, configuration data from network devices. A portion of the configuration data obtained from one or more of the network devices is in a first native format and another portion of the configuration data obtained from another one or more of the network devices is in a second native format different from the first native format. The configuration data in the first and second native formats is converted into a common format. Stored configuration rules are applied to the converted configuration data in the common format to determine when at least one of the configuration rules has been violated. A notification including an indication of the configuration rule is generated and output, via an interactive dashboard graphical user interface (GUI), when the determination indicates that the configuration rule has been violated.

12 Claims, 6 Drawing Sheets

NotSshKey: &NotSshKey  
  name: Not ssh key rsa  
  check: *RULE_NOT  
  rules:  
    - {name: ssh key rsa, parameter: ssh key, value: rsa, check: *RULE_ARRAY_CONTAINS_REGEX}

Checks: &Checks  
  name: Checks  
  check: *RULE_ANY  
  rules:  
    - {name: ssh key rsa 1024, parameter: ssh key, value: 'rsa 1024', check: *RULE_ARRAY_CONTAINS_REGEX}  
    - *NotSshKey Requirements: &Requirements  
  name: Requirements  
  check: *RULE_REQUIRE_ALL  
  rules:  
    - {name: Cisco Type, value: Cisco, check: *RULE_TYPE_REGEX}  
    - {name: Cisco Config Upload, parameter: ConfigDataConnectors, value: Cisco Config Upload, check: *RULE_ARRAY_CONTAINS}

Rule:  
  name: Cisco ssh key rsa 1024  
  type: Cisco  
  description: ssh key rsa 1024  
  severity: *RULE_SEVERITY_MEDIUM  
  check: *RULE_ALL  
  rules:  
    - *Requirements  
    - *Checks

METHODS FOR MANAGING NETWORK DEVICE CONFIGURATIONS AND DEVICES THEREOF

FIELD

This technology generally relates to enterprise networks and, more particularly, to methods and devices for managing network device configurations in enterprise networks.

BACKGROUND

As enterprise networks increase in scale, they tend to include many devices (e.g., switches, arrays, hosts, and servers) from different vendors and associated with different technologies. In one particular example, storage area networks (SANs) often include storage appliances, switches, and block storage devices that originate from a number of different vendors. The scale, complexity, and diversity of many enterprise networks, render it increasingly difficult to manage configurations of network devices to ensure compliance with enterprise policies.

Current solutions for managing network device configurations are generally technology and/or vendor specific, and are inoperable or ineffective in diverse network environments with different technologies and network devices originating from different vendors. Other solutions utilize agents installed on network devices to obtain configuration data. However, many network devices (e.g., certain types of switches) do not support agents. Accordingly, current solutions for managing network device configurations do not have the ability to consolidate, filter, or analyze configuration data and are ineffective, inflexible, and/or inefficient, resulting in reduced configuration compliance and associated security vulnerabilities.

SUMMARY

A method for managing network device configurations, implemented by one or more configuration management server devices, includes obtaining, via one or more communication networks, configuration data from a plurality of network devices. A portion of the configuration data obtained from one or more of the plurality of network devices is in a first native format and another portion of the configuration data obtained from another one or more of the plurality of network devices is in a second native format that is different from the first native format. The configuration data in the first and second native formats is converted into a common format that is different from the first and second native formats. One or more stored configuration rules are applied to the converted configuration data in the common format to determine when at least one of the configuration rules has been violated. A notification including an indication of the at least one of the configuration rules is generated and output, via an interactive dashboard graphical user interface (GUI), when the determination indicates that the at least one of the configuration rules has been violated.

A configuration management server device includes memory comprising programmed instructions stored thereon and one or more processors configured to be capable of executing the stored programmed instructions to obtain, via one or more communication networks, configuration data from a plurality of network devices. A portion of the configuration data obtained from one or more of the plurality of network devices is in a first native format and another portion of the configuration data obtained from another one or more of the plurality of network devices is in a second native format that is different from the first native format. The configuration data in the first and second native formats is converted into a common format that is different from the first and second native formats. One or more stored configuration rules are applied to the converted configuration data in the common format to determine when at least one of the configuration rules has been violated. A notification including an indication of the at least one of the configuration rules is generated and output, via an interactive dashboard graphical user interface (GUI), when the determination indicates that the at least one of the configuration rules has been violated.

A non-transitory computer readable medium having stored thereon instructions for managing network device configurations includes executable code which when executed by one or more processors, causes the processors to obtain, via one or more communication networks, configuration data from a plurality of network devices. A portion of the configuration data obtained from one or more of the plurality of network devices is in a first native format and another portion of the configuration data obtained from another one or more of the plurality of network devices is in a second native format that is different from the first native format. The configuration data in the first and second native formats is converted into a common format that is different from the first and second native formats. One or more stored configuration rules are applied to the converted configuration data in the common format to determine when at least one of the configuration rules has been violated. A notification including an indication of the at least one of the configuration rules is generated and output, via an interactive dashboard graphical user interface (GUI), when the determination indicates that the at least one of the configuration rules has been violated.

This technology has a number of associated advantages including providing methods, non-transitory computer readable media, and configuration management server devices that more effectively manage network device configurations. With this technology, configuration data can be obtained from an increased number of network devices, across platforms, and without using agents. The configuration data is then converted based on a common format to facilitate consolidation, filtering, searching, and the application of configuration rules that identify configuration violations. Accordingly, this technology provides a technology and vendor agnostic solution that efficiently manages network device configurations to improve compliance with configuration policies.

BRIEF DESCRIPTION OF THE DRAWINGS

FIG. 4 is exemplary source code illustrating an exemplary configuration rule;

DETAILED DESCRIPTION

Figure 1:
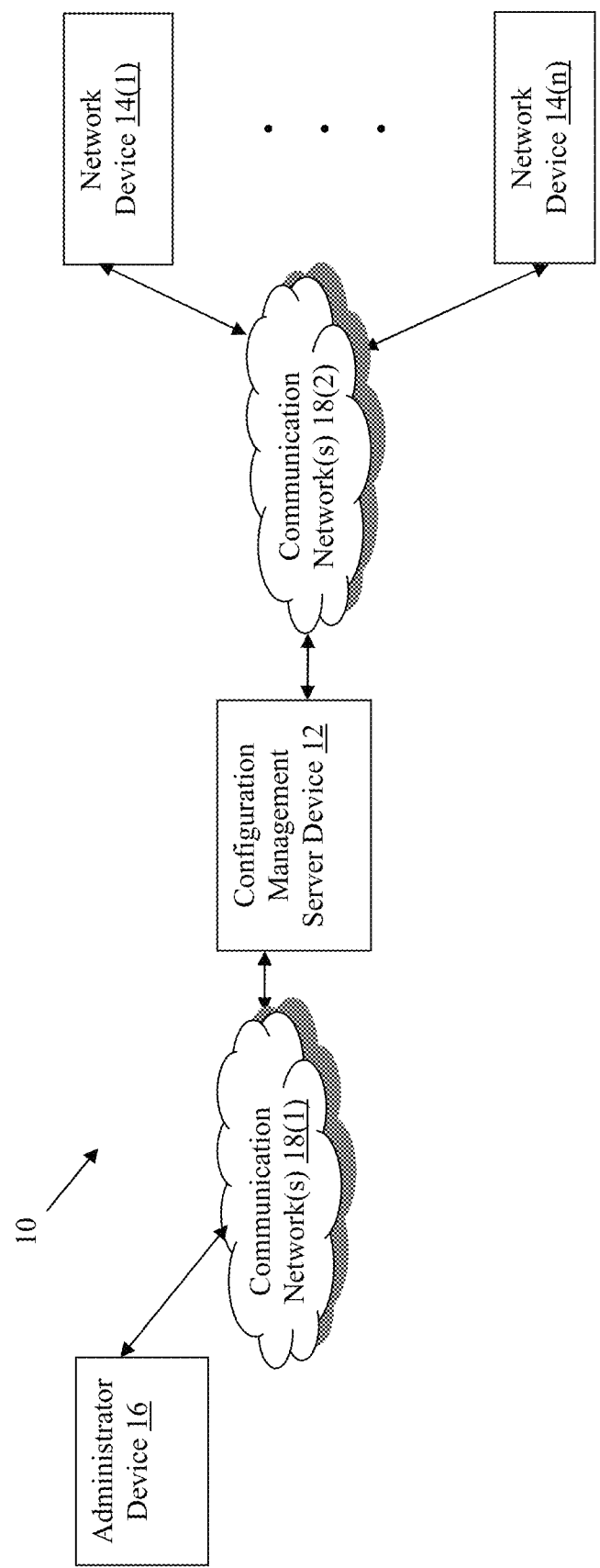
FIG. 1 is a block diagram of an exemplary network environment with an exemplary configuration management server device.

Referring to FIG. 1, an exemplary network environment 10 with an exemplary configuration management server device 12 is illustrated. The configuration management server device 12 in this example is coupled to a plurality of network devices 14(1)-14(n) and an administrator device 16 via communication network(s) 18(1) and 18(2), although the configuration management server device 12, network devices 14(1)-14(n), and/or administrator device 16, may be coupled together via other topologies. The network devices 14(1)-14(n) can include any type of network equipment capable of operating based on a stored configuration, such as storage appliances, arrays, switches, or storage devices, for example. This technology provides a number of advantages including methods, non-transitory computer readable media, and configuration management server devices that more efficiently and effectively manage network device configurations to improve policy compliance and reduce security vulnerabilities.

Figure 2:
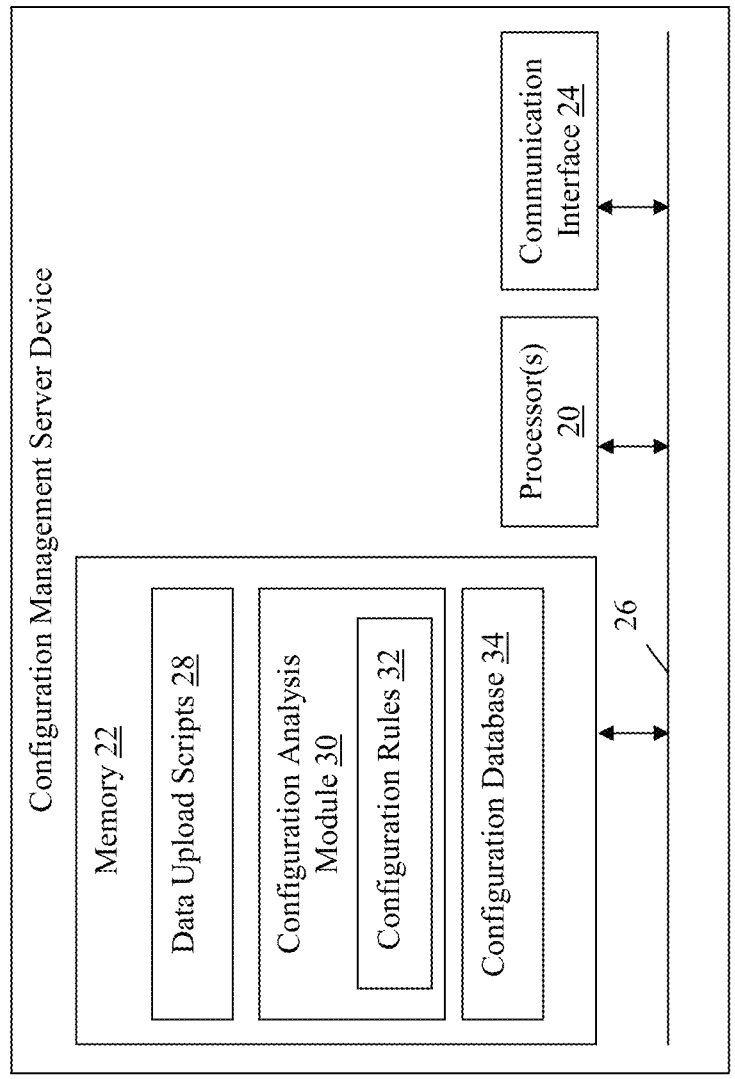
FIG. 2 is a block diagram of the exemplary configuration management server device of FIG. 1.

Referring to FIGS. 1-2, the configuration management server device 12 in this example includes one or more processors 20, a memory 22, and/or a communication interface 24, which are coupled together by a bus 26 or other communication link, although the configuration management server device 12 can include other types and/or numbers of elements in other configurations. The processor(s) 20 of the configuration management server device 12 may execute programmed instructions stored in the memory 22 for the any number of the functions described and illustrated herein. The processor(s) 20 of the configuration management server device 12 may include one or more CPUs or general purpose processors with one or more processing cores, for example, although other types of processor(s) can also be used.

The memory 22 of the configuration management server device 12 stores these programmed instructions for one or more aspects of the present technology as described and illustrated herein, although some or all of the programmed instructions could be stored elsewhere. A variety of different types of storage devices, such as random access memory (RAM), read only memory (ROM), hard disk, solid state drives, flash memory, or other computer readable medium which is read from and written to by a magnetic, optical, or other reading and writing system that is coupled to the processor(s) 20, can be used for the memory 22.

Accordingly, the memory 22 of the configuration management server device 12 can store one or more applications that can include executable instructions that, when executed by the configuration management server device 12, cause the configuration management server device 12 to perform actions, such as to transmit, receive, or otherwise process network messages, for example, and to perform other actions described and illustrated below with reference to FIGS. 3-6. The application(s) can be implemented as modules or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the configuration management server device 12 itself, may be located in virtual server(s) running in a cloud-based computing environment rather than being tied to one or more specific physical network computing devices. Also, the application (s) may be running in one or more virtual machines (VMs) executing on the configuration management server device 12.

In this particular example, the memory 22 of the configuration management server device 12 includes data upload scripts 28, a configuration analysis module 30 storing configuration rules 32, and a configuration database 34, although the memory 22 can include other policies, modules, databases, or applications, for example. The data upload scripts 28 in this example can be executed by the configuration management server device 12 to obtain configuration data from one or more of the network devices 14(1)-14(n) in a plurality of different types of native formats (e.g., as supported by particular vendors of the network devices 14(1)-14(n)).

In particular, each of the data upload scripts 28 may be configured to obtain configuration data for a particular subset of the network devices 14(1)-14(n). In one example, the subset can be switch network devices associated with a particular vendor, although the data upload scripts 28 can be configured to obtain configuration data for other types of subsets of the network devices 14(1)-14(n) in other examples. The configuration data can relate to any type of setting or parameter associated with one or more of the network devices 14(1)-14(n).

The configuration analysis module 30 is configured to process the configuration data in the native formats to convert the configuration data into a common format. In one example, the common format includes an indication of a node, node parameters, an indication of devices associated with the node, and device parameters associated with each of the devices, although other types of common formats can also be used in other examples. In this particular example, the node and device parameters can each include at least one name/value pair corresponding to the settings or parameters in the native configuration data.

The configuration analysis module 30 is further configured in this example to apply the configuration rules 32 based on established configuration policies and/or as submitted by an administrator using the administrator device 16, to identify any policy violations associated with the network devices 14(1)-14(n). The configuration analysis module 30 can also generate an interactive dashboard graphical user interface (GUI) to facilitate administrator operations on the configuration data or violation data resulting from a configuration scan. Optionally, the raw or native configuration data, converted configuration data in the common format, and/or the violation data can be maintained in the configuration database 34 to facilitate the conversion, application of rules, and/or operations facilitated by the interactive dashboard GUI.

The communication interface 24 of the configuration management server device 12 operatively couples and communicates between the configuration management server device 12, the network devices 14(1)-14(n), and/or the administrator device 16, which are all coupled together by the communication network(s) 18(1) and 18(2), although other types and/or numbers of communication networks or systems with other types and/or numbers of connections and/or configurations to other devices and/or elements can also be used.

By way of example only, the communication network(s) 18(1) and 18(2) can include local area network(s) (LAN(s)) or wide area network(s) (WAN(s)), and can use TCP/IP over Ethernet and industry-standard protocols, although other types and/or numbers of protocols and/or communication networks can be used. The communication network(s) 18(1) and 18(2) in this example can employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The configuration management server device 12 can be a standalone device or integrated with one or more other devices or apparatuses. In one particular example, the configuration management server device 12 can include or be hosted by one of the network devices 14(1)-14(n), and other arrangements are also possible. Moreover, one or more of the devices of the configuration management server device 12 can be in a same or a different communication network including one or more public, private, or cloud networks, for example.

The administrator device 16 in this example includes any type of computing device that can interface with the configuration management server device 12, such as via the dashboard interface GUI, for example. Accordingly, the administrator device 16 can be a mobile computing device, desktop computing device, laptop computing device, tablet computing device, or the like. The administrator device in this example includes a processor, a memory, and a communication interface, which are coupled together by a bus or other communication link, although other numbers and/or types of network devices could be used.

The administrator device 16 may run interface applications, such as a standard web browser or standalone client application, which may provide an interface to communicate with the configuration management server device 12 via the communication network(s) 18(1) in order to interface with the interactive dashboard GUI. The administrator device 16 may further include a display device, such as a display screen or touchscreen, and/or an input device, such as a keyboard, for example.

Although the exemplary network environment 10 with the configuration management server device 12, network device 14(1)-14(n), administrator device 16, and communication network(s) 18(1) and 18(2) are described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 10, such as the configuration management server device 12, network devices 14(1)-14(n), or administrator device 16, for example, may be configured to operate as virtual instances on the same physical machine. In other words, one or more of the configuration management server device 12, network devices 14(1)-14(n), or administrator device 16 may operate on the same physical device rather than as separate devices communicating through communication network(s) 18(1) and 18(2). Additionally, there may be more or fewer configuration management server devices, network devices, or administrator devices than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 3:
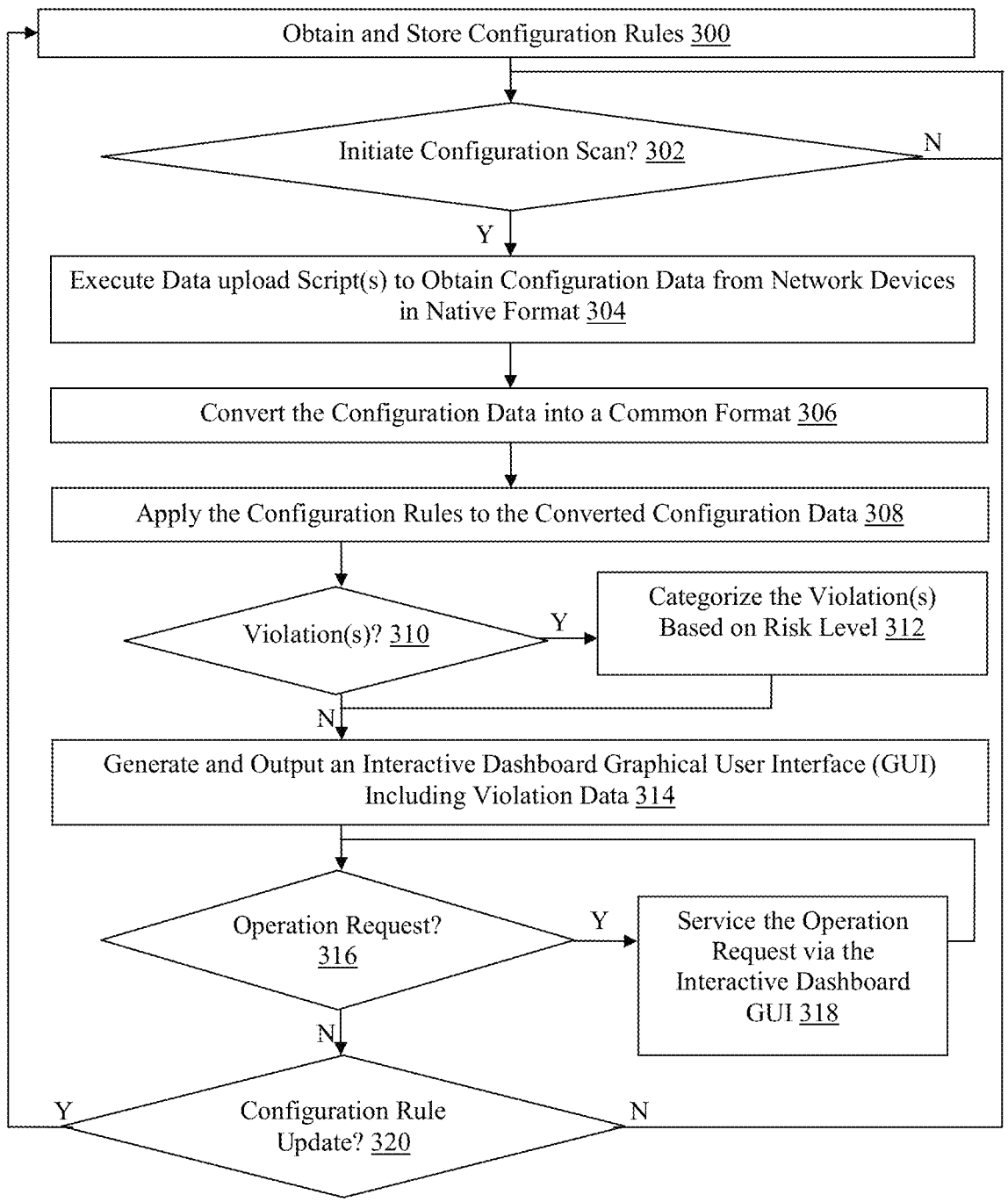
FIG. 3 is a flowchart of an exemplary method for managing network device configurations.

An exemplary method of managing network device configurations will now be described with reference to FIGS. 1-6. Referring more specifically to FIG. 3, in step 300 in this example, the configuration management server device 12 obtains configuration rules 32 that correspond with one or more enterprise policies (e.g., relating to security in one or more portions of the network environment 10). In this example, the rules are capable of being applied to stored configuration data that is in a common format, as described and illustrated in more detail later. Optionally, the configuration rules 32 can be obtained from the administrator device 16 via a provided GUI and/or the configuration rules 32 can be stored in the memory 22 (e.g., in the configuration database), although other methods of obtaining and/or storing the configuration rules 32 can also be used in other examples.

Referring more specifically to FIG. 4, exemplary source code 400 for an exemplary one of the configuration rules 32 is illustrated. In this example, the one of the configuration rules 32 relates to SSH key types for a subset of the network devices 14(1)-14(n) and is applicable to particular name/value pairs in the common format for configuration data. Additionally, the severity of a violation of the one of the configuration rules 32 in the source code 400 is indicated as being "medium," which is optionally used to categorize rule violations, as described and illustrated in more detail later with reference to step 312 of FIG. 3.

In step 302, the configuration management server device 12 determines whether a configuration scan of the network devices 14(1)-14(n) should be initiated. Optionally, a configuration scan can be automatically initiated based on a periodic time period (e.g., daily). In other examples, a user of the administrator device 16 can explicitly initiate a configuration scan, and other methods of initiating a configuration scan can also be used. If the configuration management server device 12 determines that a configuration scan should not be initiated, then the No branch is taken back to step 302 and the configuration management server device 12 in this example effectively waits for a configuration scan to be initiated. However, if the configuration management server device 12 determines that a configuration scan should be initiated, then the Yes branch is taken to step 304.

In step 304, the configuration management server device 12 executes the data upload scripts 28 to obtain configuration data from the network devices 14(1)-14(n) in a native format. One or more of the network devices 14(1)-14(n) can provide configuration data, in response to requests prompted based on the execution of the data upload scripts 28, in a native format different than another native format of configuration data prompted by another one or more of the network devices 14(1)-14(n). Additionally, the method(s) implemented by the data upload scripts 28 can be different for any number of the network devices 14(1)-14(n) (e.g., based on vendor or technology). Accordingly, one or more of the network devices 14(1)-14(n) may have different associated command line interfaces (CLIs), tools sets, and/or syntaxes, for example, resulting in different methods of obtaining the associated configuration data.

In one particular example, one of the data upload scripts 28 is configured to execute a "show running-config" command for one or more of the network device 14(1)-14(n) that are manufactured by Cisco Systems, Inc. of San Jose, Calif. in order to obtain raw configuration data in a native format. In another example, one of the data upload scripts 28 is configured to execute a "config upload" command for one or more of the network devices 14(1)-14(n) that are manufactured by Brocade Communications Systems, Inc., also of San Jose, Calif., in order to obtain raw configuration data in another native format. Other types of commands, scripts, and/or method for obtaining raw configuration data in a native format from one or more of the network devices 14(1)-14(n) can also be used in other examples.

In step 306, the configuration management server device 12 converts the raw configuration data in the native format(s), as obtained from the network devices 14(1)-14(n), into a common format. In one example, the common format includes an indication of a node, one or more node parameters, an indication of one or more devices associated with the node, or one or more device parameters associated with each of the devices. In this example, the node and device parameters each include at least one name/value pair.

An exemplary portion of converted configuration data including an indication of a device and associated parameters, with name/value pairs, is illustrated below:
. . . "name": "fc2/23", "_type": "Device"}, {"parameters": [{"value": "switchport trunk mode on", "name": "switchport trunk mode on", "_type": "Parameter"}, {"value": "switchport rate-mode dedicated", "name": "switchport rate-mode dedicated", "_type": "Parameter"}, {"value": "channel-group 1 force", "name": "channel-group 1 force", "_type": "Parameter"}, {"value": "switchport mode E", "name": "switchport mode E", "_type": "Parameter"}, {"value": "no shutdown", "name": "no shutdown", "type": "Parameter"}], . . .
In this example, the configuration management server device 12 effectively abstracts the raw configuration data, which may be in several different native formats, into a common format based on node, device, and parameter language primitives.

In step 308, the configuration management server device 12 applies one or more of the stored configuration rules 32 obtained in step 300 to the converted configuration data in the common format. Accordingly, each of the configuration rules 32 can advantageously be applied to configuration data associated with disparate types of the network devices 14(1)-14(n) according to the common format of the converted configuration data.

In step 310, the configuration management server device 12 determines whether at least one of the configuration rules 32 has been violated. If the configuration management server device 12 determines that at least one of the configuration rules 32 has been violated, then the Yes branch is taken to step 312.

In step 312, the configuration management server device 12 optionally categorizes the violation(s) based on a risk level associated with the violated ones of the configuration rules 32. In one example, the risk level, also referred to herein as severity, can be defined within the configuration rules 32 as obtained in step 300. In other examples, the configuration management server device 12 can use other criteria for determining a risk level subsequent to identifying the violation of one of the configuration rules 32, and other methods of categorizing the violation(s) can also be used in other examples.

Figure 5:
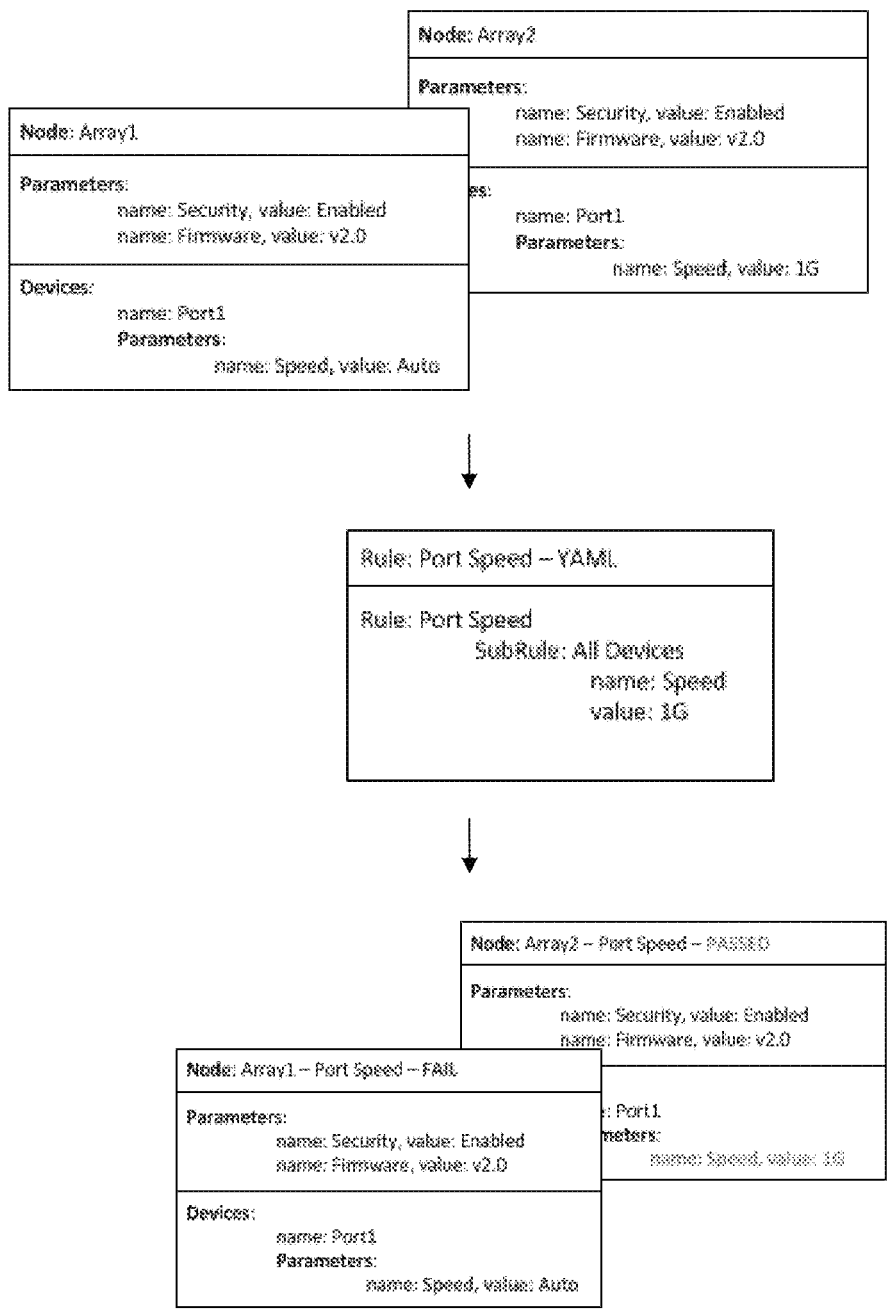
FIG. 5 is functional flow diagram illustrating the an exemplary result of an application of an exemplary configuration rule to exemplary configuration data in an exemplary common format.

Referring more specifically to FIG. 5, a functional flow diagram including an exemplary result of an application of an exemplary one of the configuration rules 32 to exemplary configuration data in an exemplary common format is illustrated. In this example, two of the network devices 14(1)-14(n), also referred to herein as nodes, are identified as "Array1" and "Aray2" and each have an associated devices referred to as "Port1." The node parameters in this example are "security" and "firmware" having values of "enabled" and "v2.0" for each of "Array1" and "Aray2." The device parameter in this example is "speed" and has value "Auto" for "Array1" and "1G" for "Array2."

In this example, the configuration management server device 12 applies one of the configuration rules 32 requiring that the port speed be "1G." Since the value of the parameter with name "speed" for the "Port1" device in "Array1" is "auto," the configuration management server device 12 will determine that the one of the configuration rules 32 has been violated in this example, which is indicated by the "fail" designation (as compared to the "passed" designation for "Array2").

Referring back to FIG. 3, subsequent to categorizing the violation(s) in step 312, or if the configuration management server device 12 determines that there was not at least one violation in step 310 and the No branch is taken, then the configuration management server device 12 proceeds to step 314. In step 314, the configuration management server device 12 generates and outputs (e.g., to the administrator device 16) an interactive dashboard GUI including violation data, which can include results of the configuration scan. The results can include an indication of any violated ones of the configuration rules 32, for example, although any other information regarding the configuration scan indicated in step 302 can also be output as part of the violation data. Optionally, the violation data can also be stored in the configuration database 34.

In step 316, the configuration management server device 12 determines whether any operations are requested (e.g., by a user of the administrator device 16) with respect to the results output to the interactive dashboard GUI. The operations in some examples can include filtering, consolidating, or searching violations of the configuration rules 32 that were identified as a result of configuration scan. If the configuration management server device 12 determines that at least one operation is received, then the Yes branch is taken to step 318.

In step 318, the configuration management server device 12 services the operation request via the interactive dashboard GUI. Accordingly, the configuration management server device 12 can process queries received via the interactive dashboard GUI using the configuration database 34, for example. Subsequent to servicing the operation request, the configuration management server device 12 returns to step 316 and again waits for an operation request to be received via the interactive dashboard GUI.

Figure 6:
FIG. 6 is an exemplary interactive dashboard graphical user interface (GUI).

Referring more specifically to FIG. 6, an exemplary interactive dashboard GUI 600 is illustrated. In this example, violations of the configuration rules 32 are categorized, and can be filtered, consolidated, searched, or otherwise organized, as severe, critical, high, medium, or low severity breaks. The violation data can also be organized based on the type of one of the network devices 14(1)-14(n) for which a violation was identified and the interactive dashboard GUI 600 also includes the number of devices, number of compliances checks, percentage in compliance, and excluded breaks in this example.

The interactive dashboard GUI 500 also includes associated top 10 lists in this example, and other types and number of information and violation data can also be included in the interactive dashboard GUI 600 shown in FIG. 6 in other examples. Additionally, a user (e.g., of the administrator device 16) can interface with the interactive dashboard GUI 600 in this example to run asset data and exemption reports, search breaks or violations of the configuration rules 32, download the configuration rules, and to show and search configuration data (e.g., the raw configuration data obtained in step 304 of FIG. 3 and/or the configuration data converted into the common format in step 306 of FIG. 3), although other operations can also be performed in other examples.

Referring back to FIG. 3, if the configuration management server device 12 determines in step 316 that there are no more operation requests (e.g., when a user of the administrator device 16 exits the interactive dashboard GUI), then the No branch is taken to step 320. In step 320, the configuration management server device 12 determines whether an update to any of the configuration rule 32 is required. Required updates to the configuration rules 32 can be indicated by an administrator via a GUI provided to the administrator device 16, for example, although other methods of initiating updates to the configuration rules 32 can also be used in other examples.

If the configuration management server device 12 determines that an update to one or more of the configuration rules 32 is required, then the Yes branch is taken back to step 300, and the configuration management server device 12 obtains and stores update(s) to the configuration rules 32. However, if the configuration management server device 12 determines in step 320 that an update to the configuration rules 32 is not required, then the No branch is taken and back to step 302, and the configuration management server device 12 again waits for a configuration scan to be initiated.

With this technology, raw configuration data in native formats obtained from a number of different types of network devices is described in a common format to facilitate a technical solution of more effective configuration scanning to a technical problem of increased security vulnerabilities. This technology problem only exists in enterprise and other computer networks. Additionally, the conversion of raw configuration data, and application of configuration rules to configuration data in a common format, are unconventional activities, and are not routine or understood in this technical field, and allow for improved configuration compliance. Moreover, functioning of configuration management server devices can be improved with this technology as configuration scanning and violation identification can be performed automatically and more efficiently for disparate types of network devices using with fewer resources.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for managing network device configurations implemented by one or more configuration management server devices, the method comprising:

executing a plurality of upload scripts configured to obtain, via one or more communication networks and from each of a plurality of network devices, configuration data of the plurality of network devices, wherein the configuration data includes hardware and software settings of the network devices, wherein each of the plurality of upload scripts is configured to obtain different corresponding native formats of configuration data from different corresponding subsets of the plurality of network devices using different methods corresponding to the different network devices, and wherein a portion of the configuration data obtained from a first one of the plurality of network devices is in a first native format by a first upload script of the plurality of upload scripts and another portion of the configuration data obtained from a second one of the plurality of network devices is in a second native format by a second upload script of the plurality of upload scripts;

converting the configuration data in the first and second native formats into a common format that is different from the first and second native formats by abstracting the configuration data into the common format that includes at least one from among a node parameter comprising a name/value pair and a device parameter comprising a name/value pair;

applying one or more stored configuration rules to the converted configuration data in the common format to determine when at least one of the configuration rules has been violated; and categorizing each of the violated at least one of the configuration rules based on a determined violation severity category selected from among a set of configured severity categories that includes a severe severity, a critical severity, a high severity, a medium severity, and a low severity, each of the configured severity categories defined by the stored configuration rules; and generating and outputting, via an interactive dashboard graphical user interface (GUI), a notification including an indication of each of the violated at least one of the configuration rules and a respective label for each determined violation severity category in conjunction with a corresponding number of violations that has been categorized for each determined violation severity category.

2. The method as set forth in claim 1, further comprising executing two or more stored data upload scripts in order to obtain the configuration data, the two or more stored upload scripts each configured to communicate with a respective subset of the plurality of network devices sharing a common vendor.

3. The method as set forth in claim 1, further comprising:

determining when a periodic time period has elapsed; and performing a configuration scan to obtain the configuration data, convert the configuration data, applying the one or more stored configuration rules, and generate and output the notification, when the determination indicates that a periodic time period has elapsed.

4. The method as set forth in claim 1, further comprising:
generating violation data based on the application of the one or more stored configuration rules, the violation data associated with the at least one of the configuration rules; and
receiving and servicing, via the interactive dashboard GUI, the one or more operations comprising filtering, consolidating, or searching.

5. A configuration management server device, comprising memory comprising programmed instructions stored thereon and one or more processors configured to be capable of executing the stored programmed instructions to:
execute a plurality of upload scripts configured to obtain, via one or more communication networks and from each of a plurality of network devices, configuration data of the plurality of network devices,
wherein the configuration data includes hardware and software settings of the network devices,
wherein each of the plurality of upload scripts is configured to obtain different corresponding native formats of configuration data from different corresponding subsets of the plurality of network devices using different methods corresponding to the different network devices, and
wherein a portion of the configuration data obtained from a first one of the plurality of network devices is in a first native format by a first upload script of the plurality of upload scripts and another portion of the configuration data obtained from a second one of the plurality of network devices is in a second native format by a second upload script of the plurality of upload scripts;
convert the configuration data in the first and second native formats into a common format that is different from the first and second native formats by abstracting the configuration data into the common format that includes at least one from among a node parameter comprising a name/value pair and a device parameter comprising a name/value pair;
apply one or more stored configuration rules to the converted configuration data in the common format to determine when at least one of the configuration rules has been violated; and
categorize each of the violated at least one of the configuration rules based on a determined violation severity category selected from among a set of configured severity categories that includes a severe severity, a critical severity, a high severity, a medium severity, and a low severity, each of the configured severity categories defined by the stored configuration rules; and
generate and output, via an interactive dashboard graphical user interface (GUI), a notification including an indication of each of the violated at least one of the configuration rules and a respective label for each determined violation severity category in conjunction with a corresponding number of violations that has been categorized for each determined violation severity category.

6. The configuration management server device as set forth in claim 5, wherein the one or more processors are further configured to be capable of executing the stored programmed instructions to execute two or more stored data upload scripts in order to obtain the configuration data, the two or more stored upload scripts each configured to communicate with a respective subset of the plurality of network devices sharing a common vendor.

7. The configuration management server device as set forth in claim 5, wherein the one or more processors are further configured to be capable of executing the stored programmed instructions to:
determine when a periodic time period has elapsed; and
perform a configuration scan to obtain the configuration data, convert the configuration data, applying the one or more stored configuration rules, and generate and output the notification, when the determination indicates that a periodic time period has elapsed.

8. The configuration management server device as set forth in claim 5, wherein the one or more processors are further configured to be capable of executing the stored programmed instructions to:
generate violation data based on the application of the one or more stored configuration rules, the violation data associated with the at least one of the configuration rules; and
receive and service, via the interactive dashboard GUI, the one or more operations comprising filtering, consolidating, or searching.

9. A non-transitory machine readable medium having stored thereon instructions for managing network device configurations communications comprising executable doe which when executed by one or more processors, causes the one or more processors to:
execute a plurality of upload scripts configured to obtain, via one or more communication networks and from each of a plurality of network devices, configuration data of the plurality of network devices,
wherein the configuration data includes hardware and software settings of the network devices,
wherein each of the plurality of upload scripts is configured to obtain different corresponding native formats of configuration data from different corresponding subsets of the plurality of network devices using different methods corresponding to the different network devices, and
wherein a portion of the configuration data obtained from a first one the plurality of network devices is in a first native format by a first upload script of the plurality of upload scripts and another portion of the configuration data obtained from a second one of the plurality of network devices is in a second native format by a second upload script of the plurality of upload scripts;
convert the configuration data in the first and second native formats into a common format that is different from the first and second native formats by abstracting the configuration data into the common format that includes at least one from among a node parameter comprising a name/value pair and a device parameter comprising a name/value pair;
apply one or more stored configuration rules to the converted configuration data in the common format to determine when at least one of the configuration rules has been violated; and
categorize each of the violated at least one of the configuration rules based on a determined violation severity category selected from among a set of configured severity categories that includes a severe severity, a critical severity, a high severity, a medium severity, and a low severity, each of the configured severity categories defined by the stored configuration rules; and generate and output, via an interactive dashboard graphical user interface (GUI), a notification including an indication of each of the violated at least one of the configuration rules and a respective label for each determined violation severity category in conjunction with a corresponding number of violations that has been categorized for each determined violation severity category.

10. The non-transitory machine readable medium as set forth in claim 9, wherein the executable code when executed by the processors further causes the one or more processors to execute two or more stored data upload scripts in order to obtain the configuration data, the two or more stored upload scripts each configured to communicate with a respective subset of the plurality of network devices sharing a common vendor.

11. The non-transitory machine readable medium as set forth in claim 9, wherein the executable code when executed by the processors further causes the one or more processors to:

determine when a periodic time period has elapsed; and perform a configuration scan to obtain the configuration data, convert the configuration data, applying the one or more stored configuration rules, and generate and output the notification, when the determination indicates that a periodic time period has elapsed.

12. The non-transitory machine readable medium as set forth in claim 9, wherein the executable code when executed by the processors further causes the one or more processors to:

generate violation data based on the application of the one or more stored configuration rules, the violation data associated with the at least one of the configuration rules; and receive and service, via the interactive dashboard GUI, the one or more operations comprising filtering, consolidating, or searching.

* * * * *